United States Patent Office 3,461,822
Patented Aug. 19, 1969

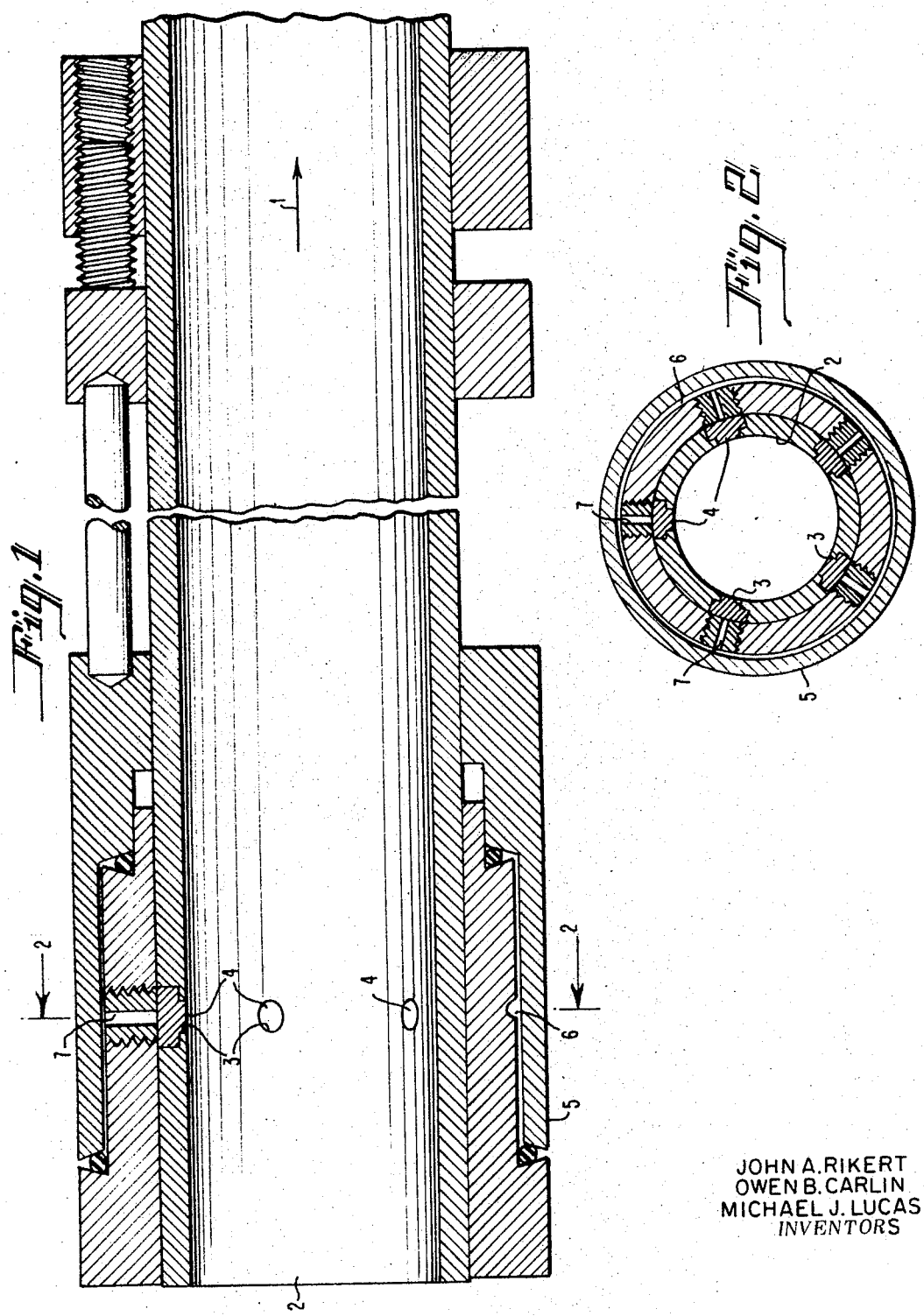

3,461,822
MANUFACTURE OF NOVELTY CONFECTIONS
John A. Rikert, Ridgefield, Conn., Owen B. Carlin, Rutherford, N.J., and Michael J. Lucas, Chicago, Ill., assignors to Standard Brands Incorporated, New York, N.Y., a corporation of Delaware
Filed June 29, 1966, Ser. No. 561,382
Int. Cl. A23l 1/27; A23g 3/28
U.S. Cl. 107—54     8 Claims

ABSTRACT OF THE DISCLOSURE

The disclosure relates to a method of coloring marshmallow. A pressurized stream of an aerated marshmallow mass is colored by transferring through a wick an edible coloring agent to a point on the surface of the marshmallow mass. After the marshmallow stream passes the wick, it is dusted with a powdered edible material and cut into predetermined sizes.

---

This invention relates to a continuous process for the manufacture of novelty confections and particularly to a process for coloring marshmallows.

In the continuous process for manufacturing marshmallows in general use today, the starting ingredients, such as disclosed in U.S. Patents 3,062,661 and 2,847,311, for example, sucrose, corn syrup and water and other ingredients, if desired, such as starch and flavoring materials, are heated while being mixed to form a syrup. This syrup is cooled and a solution of gelatin is incorporated therein with agitation to produce a homogeneous mass. Usually the flavoring material is also incorporated in the mass in this step. The mass mix can then be beaten or whipped under pressure while introducing compressed air or the like so as to effect a fine dispersion of the gas substantially uniformly throughout the marshmallow mass. This mass is extruded onto a cooling belt where it is allowed to set, i.e., become sufficiently shape-retaining so that it can be cut without permanently deforming the same, dusted with starch, sugar or the like, cut into predetermined sizes, dusted again and finally packaged.

Marshmallows made in this manner are generally vanilla flavored and have the characteristic solid white color. Less often, marshmallows of other solid colors and flavors are produced, but we are not aware of any marshmallows that have been produced by the continuous process which are colored on the surface thereof, where the coloring is vivid and distinctively apparent to the consumer.

Accordingly, the principal object of the present invention is to provide a method of coloring marshmallows whereby the marshmallow is colored on the surface thereof.

Another object of the present invention is to provide a method of coloring marshmallows to produce marshmallows having a plurality of applied stripes extending from one end of the cut marshmallow to the opposite end thereof.

It is a further object of the present invention to provide an in-line process in the continuous process for the manufacture of marshmallows having a plurality of applied spaced stripes extending from substantially one end of the marshmallow to the opposite end thereof.

A still further object of the present invention is to provide a process for striping marshmallows which is relatively simple and requires little investment in equipment.

Accordingly, the present invention is directed to a method of coloring marshmallows which comprises the steps of providing a pressurized stream of an aerated marshmallow mass, transferring through a wick an edible coloring agent to a point on the surface of the stream, extruding said stream, dusting the extruded marshmallow with a powdered edible material and cutting the marshmallow into predetermined sizes.

FIGURE 1 is a longitudinal cross sectional view of an apparatus particularly adapted to carry out the method of the present invention.

FIGURE 2 is a cross sectional view of the apparatus taken along line 2—2 of FIGURE 1.

With reference to the drawing, an aerated marshmallow stream is pumped in the direction of 1 through an extrusion nozzle 2. In the extrusion nozzle 2, there are a number of apertures 3 wherein there are mounted wicks 4 which extend into the marshmallow stream. A metal collar 5 having a channel 6 in the inner side thereof and conduit 7 extending through the collar 5 to the channel 6 is positioned around and in line with the apertures 3 in the extrusion nozzle to define a circumferentially closed channel which is in communication with the apertures 3. The conduit 7 in the collar 5 is connected to a dye reservoir (not shown) through a dye feeding tube (not shown).

The wicking of the edible coloring agent to the marshmallow stream may be accomplished by mounting a wick in an aperture in the tube or pipe containing the stream. One end of the wick is positioned slightly within or just contacting the marshmallow stream and the other end is left free to contact and absorb the coloring agent. The coloring agent, advantageously an aqueous solution or dispersion of an edible dye, is preferably transferred to the free end of the wick under a pressure greater than the pressure exerted by the marshmallow stream in the vicinity of the aperture. In commercial production of extruded marshmallow where the marshmallow stream is traveling at a relatively high rate of speed, this applied pressure will insure that the wicks will not be exhausted of coloring agent thus causing the stripes to vary in color intensity during the production.

When the wick is positioned within the marshmallow stream, it is preferred that it extend up to ⅛ of an inch into the stream. A very attractive colored marshmallow, for instance a striped marshmallow, may be produced by positioning a number of wicks in apertures which are spaced substantially in the same plane equidistant around the circumference of the tube or pipe. The ends of the wicks in contact, or slightly within the stream, may vary in width depending upon the width of the stripe desired. This will result in a marshmallow which has a plurality of evenly colored spaced stripes. A common dye reservoir under a pressure mentioned above can supply each of the wicks with the requisite amount of dye to produce a marshmallow with a plurality of stripes that are vivid and distinctively apparent and are substantially equal in shade of color and width of stripe.

The wicks may be composed of any material, for instance felt, that will absorb the coloring agent and is capable of transferring such agent through itself due to capillary action. Although the wicks are characterized as being capable of transferring the coloring agent by capillary action, it should be understood that this characterization is used merely to define the wick and that the actual transfer of the coloring agent when the dye reservoir is under pressure may be due principally to this pressure and only incidentally to capillary pressure. Marshmallow, before it is allowed to set, for instance before it is extruded, is extremely flowable and sticky. Thus, if the pipe or tube containing the pressurized marshmallow stream has a hole or aperture therein, the marshmallow has a tendency to escape through or plug such hole or aperture. The wicks noted above when positioned in such apertures will prevent the marshmallow from plugging the aperture and thereby causing stoppage of the flow of the coloring agent to the stream.

The coloring agent may be any material which will be transferred through the capillaries of the wick; for instance, either a water solution of an edible dye or a fine dispersion of a coloring agent. Of course, the particles in the dispersion should be sufficiently small to pass through the capillaries and not plug the same. Water soluble dyes are preferred, and have been found to readily fix to the marshmallow and not easily rub or flake off during the packaging and handling of the marshmallows.

When the wicks are positioned within the marshmallow stream it is preferred that they not be located too near or too far from the extrusion end of the stream. If the wicks are located too far from the extrusion end of the marshmallow stream, the stripes will tend to broaden out and became faded due to friction between the inner wall of the tube or pipe containing the stream of aerated marshmallow and the surface of the stream. The extent of this broadening out of the stripes may be such that the stripes will tend to overlap and the whole outer area of the marshmallow will have a one color surface appearance. On the other hand, if the wicks are located too near the extrusion end of the marshmallow stream they will leave grooves in the marshmallow. The marshmallow in the stream can be considered a very viscous fluid that will eventually conform to the shape of its container. Thus, when the wicks are located too near the extrusion end of the marshmallow stream, the marshmallow does not have sufficient time to re-conform to the shape of the tube or pipe carrying the stream and accordingly the grooves made by the wicks will still be apparent after the stream is extruded.

In order to more clearly disclose the nature of the present invention specific examples will hereinafter be described. It should be understood, however, that this is done solely by way of example and is intended neither to delineate the scope of the invention nor limit the ambit of the appended claims.

Example 1

This example illustrates the preparation of striped marshmallows on a pilot plant scale using felt wicks through which a dye solution is transferred by capillary action.

A marshmallow mass mix was prepared in the normal manner and then pumped into a steam jacketed supply kettle which was maintained at 145–150° F. and from there into a Votator CR mixer where compressed air was metered thereto at a rate sufficient to produce a finished marshmallow product having a density of 0.30 to 0.34 gm./cc. A mass flow rate of ½ lb./min. was maintained through the Votator which operated at 300 r.p.m. From there it was pumped into a Votator scraped surface heat exchanger where it was cooled to 100–110° F., past the back pressure valve maintained at 100–105 p.s.i.g. and into a 1⅛" I.D. tube having 5 apertures in the same plane perpendicular to the axis of the tube and spaced equidistant around the circumference of the tube. These apertures were located ¼" from the extrusion end of the tube. In these apertures were mounted felt strips so that the ends thereof protruded slightly past the inner surface of the tube. The other end of the felt strips protruded slightly past the outer wall of the tube. The outer ends of the felt strips were overwrapped with a single felt strip and a dye solution supplied thereto by dripping the dye solution onto the overwrapped felt. The dye solution contained 5 percent F.D. and C. Red #2 and Red #3 and about 8 percent sucrose. The marshmallow contacted these felts and was accordingly striped and thereafter extruded into a bed of starch, allowed to set, cut into predetermined sizes, dusted again with starch and finally packaged.

Example 2

This example illustrates the preparation of striped marshmallow on a commercial scale using felt wicks through which a dye solution was forced under pressure.

A marshmallow mass mix was prepared in the normal manner and pumped into a holding tank where it was maintained at a temperature between 150° and 160° F. and from there into a Votator mixer where compressed air was metered thereto at a rate sufficient to produce a finished marshmallow product with a density of 0.325 to 0.335. Then it was pumped into a Votator scraped surface heat exchanger where it was cooled to a temperature of 97° to 100° F., past a back pressure valve adjusted to maintain the pressure of the marshmallow at 200–225 p.s.i.g. and into a 1.049" I.D. tube having 5 apertures, with a diameter of ¼" spaced susbtantially in the same plane perpendicular to the axis of the tube and equidistant around the circumference of the tube. The apertures were located 1$\frac{5}{32}$" from the extrusion end of the tube. In these apertures were mounted SAE–F–1 felt wicks having a $\frac{7}{32}$" length and a ¼" diameter. The felt wicks protruded approximately $\frac{1}{32}$ of an inch into the marshmallow stream. A metal collar having a channel in the inner side thereof and a conduit extending through the collar to the channel was positioned around and in line with the apertures in the tube to define a circumferential closed channel which was in communication with the apertures. The conduit in the collar was connected to a dye reservoir by a feeding tube. Air pressure of about 15 p.s.i.g. was applied to the dye reservoir to force the dye through the feeding tube, into the conduit, around the closed channel, into each of the apertures, through the felt wicks and onto the marshmallow stream. In this manner of applying the dye solution to the marshmallow stream the pressure of the solution on the various wicks is essentially the same and makes possible the striping of a marshmallow stream traveling at a high rate of speed as in commercial production of extruded marshmallow. The dye solution contained 5 percent F.D. and C. Red. #2 and Red #3 and about 2.5 percent sucrose.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What we claim is:

1. A method for coloring marshmallow which comprises providing a pressurized stream of an aerated marshmallow mass, transferring through a wick an edible coloring agent to a point on the surface of the stream, extruding said stream, dusting the extruded marshmallow with a powdered edible material and cutting the marshmallow into predetermined sizes.

2. A method for coloring marshmallow as defined in claim 1, wherein the coloring agent is supplied to the wick under a pressure greater than the pressure exerted by the aerated stream of marshmallow in the vicinity of the wick.

3. A method for coloring marshmallow as defined in claim 2, wherein the wick is composed of felt.

4. A method for coloring marshmallow as defined in claim 3, wherein the wick extends up to one quarter of an inch into the aerated marshmallow stream.

5. A method for coloring marshmallow as defined in claim 4, wherein the wick is located susbtantially near the extruding end of said stream to provide a substantially well defined stripe without leaving permanent grooves in the extruded marshmallow.

6. A method for coloring marshmallow as defined in claim 5, wherein the edible coloring agent is an aqueous solution of an edible dye.

7. A method for coloring marshmallow as defined in claim 2, wherein the wick is composed of a material which is characterized as having the ability to transfer an aqueous solution of an edible dye through itself by capillary action.

8. A method for coloring marshmallow as defined in claim 6, wherein the wick extends up to one-eighth of an inch into the aerated marshmallow stream.

References Cited

UNITED STATES PATENTS

| | | |
|---|---|---|
| 1,263,009 | 4/1918 | Williams. |
| 1,466,338 | 8/1923 | Nicholson _____ 107—3 |
| 1,493,082 | 5/1924 | Laskey. |
| 2,349,423 | 5/1944 | Harber _____ 118—13 |
| 3,344,753 | 10/1967 | Ramsey. |

ROBERT W. JENKINS, Primary Examiner

ARTHUR O. HENDERSON, Assistant Examiner

U.S. Cl. X.R.

99—134, 148